United States Patent
Takei et al.

[11] Patent Number: 6,002,674
[45] Date of Patent: Dec. 14, 1999

[54] NETWORK CONTROL SYSTEM WHICH USES TWO TIMERS AND UPDATES ROUTING INFORMATION

[75] Inventors: Katsuaki Takei; Syouichi Sasaki; Masuhisa Fujimura, all of Tokyo, Japan

[73] Assignee: Oki Electric Industry Co., Ltd., Tokyo, Japan

[21] Appl. No.: 08/884,327

[22] Filed: Jun. 27, 1997

[30] Foreign Application Priority Data

Jun. 28, 1996 [JP] Japan .................................. 8-188309

[51] Int. Cl.⁶ ............................ H04L 12/28; H04L 12/56
[52] U.S. Cl. ........................... 370/254; 370/389; 709/242
[58] Field of Search ..................................... 370/463, 395, 370/237, 252, 253–5, 389, 400, 392, 396–9; 709/242

[56] References Cited

U.S. PATENT DOCUMENTS

| | | | |
|---|---|---|---|
| 5,717,689 | 2/1998 | Ayanoglu | 370/349 |
| 5,835,710 | 11/1998 | Nagami et al. | 395/200.8 |
| 5,841,775 | 11/1998 | Huang | 370/422 |

OTHER PUBLICATIONS af–pnni–0055.000 Letter Ballot, ATM Forum Technical Committee, pp. 36–37, 15–17, 357–364 and 40.

*Primary Examiner*—Dang Ton
*Assistant Examiner*—David R Vincent
*Attorney, Agent, or Firm*—Wenderoth, Lind & Ponack, L.L.P.

[57] ABSTRACT

To provide a network control system which prevents a system performance degradation caused by generating/updating routing information and enables a connection request to be established reliably. The significant change detection module 33 sets the flag 33a to on when a predetermined change occurs. The first timer 21 determines the longest interval at which the routing information 24 is updated, while the second timer 22 determines the shortest interval at which the routing information 24 is updated. When the first timer 21 times out, the routing information update control module 23 unconditionally updates the routing information 24. When the second timer 22 times out, the routing information update control module 23 updates the routing information 24 only if the flag 33a is on.

5 Claims, 4 Drawing Sheets

NETWORK CONTROL SYSTEM WHICH USES TWO TIMERS AND UPDATES ROUTING INFORMATION

BACKGROUND OF THE INVENTION

1. Field of the Invention

The present invention relates to the update of routing control information. In a network where a plurality of switches each having an ATM (Asynchronous Transfer Mode) interface are interconnected, the switches make SVC (Switched Virtual Circuit) connection with each other by referring to the information produced by exchanging PNNI routing control packets (Hello packets and PTSP (PNNI Topology State Packets)).

2. Description of the Prior Art

PNNI (Private Network to Network Interface) Specification V1. 00 (hereafter called PNNI) from The ATM Forum Technical Committee describes the interface via which the switches in an ATM network make SVC connections. This PNNI contains information on the following:

(a) PNNI routing control packet exchange method and exchange information (b) Interface requirements for SVC connection and connection establishment procedures The PNNI specifies that topology information be required for generating routing information. The topology information refers to network component information or state information on the network components such as lines and switches. This information is obtained by exchanging PNNI routing control packets the switches within the network.

In the SVC connection mode, each call request from a terminal causes routing information to be read from the destination address field of the call request message to determine the best route (the route composed of lines and switches ensuring the fastest delivery of a message to the destination). One of the following methods is used for generating or updating this routing information:

(a) Routing information is generated from the topology information when a call is made from a terminal (b) Routing information is generated when a PNNI routing control packet is received (c) Topology information is generated from a received PNNI routing control packet and, at a specified interval, routing information is generated.

However, methods (a), (b), and (c) described above have the following problems:

In case of (a), a delay in setting up a call from an originating terminal degrades the overall system performance. In case of (b), there is a possibility that a large number of PNNI routing control packets are received when a line or a switch in the network fails or when a condition (repetitive errors and error recovery processing) occurs. This condition causes routing information to be updated frequently, affecting the system performance. In case of (c), PNNI routing control packet information exchanged in the network is not reflected on the routing information immediately. Therefore, when an SVC connection request is received before routing information is updated by a PNNI routing control packet, the connection request may fail; conversely, when an error is already recovered but the routing information is not yet updated accordingly, the connection request may fail.

SUMMARY OF THE INVENTION

It is an object of the present invention to provide a network control system allowing the user to make a connection reliably while minimizing the degradation of system performance caused by routing information generation or update.

To achieve this objective, this system has two timers: the first timer sends the time-out signal at a specific interval and the second timer at an interval shorter than that of the first timer. The first timer sends the time-out signal at the longest interval for updating the routing information when the network is in the normal state. The second timer sends the time-out signal at the shortest interval for updating the routing information. The second timer generates the time-out signal at this interval to prevent a large number of PNNI routing control packets from being generated and the system performance from being degraded when a line or a switch in the network fails or when a line unbalance condition (repetitive errors and error recovery processing) occurs.

The configuration of the system according to the present invention prevents the routing information from being updated at an interval shorter than that of the second timer even when errors and error recovery processing are repetitively performed, thereby minimizing the degradation of the overall system performance. In addition, when the second timer times out, the routing information is updated only when a significant change has occurred. Therefore, by specifying whatever significant change is felt most appropriate, the system is able to update the routing information accordingly.

BRIEF DESCRIPTION OF THE DRAWINGS

The present invention will be understood more fully from the detailed description and the accompanying drawings below of the preferred embodiments of the invention.

In the drawings.

DESCRIPTION OF THE PREFERRED EMBODIMENTS

Referring to the attached drawings, there is shown an embodiment according to the present invention. The embodiment has the first timer and the second timer. The second timer sends the time-out signal at an interval shorter than that of the first timer. The ratio of the interval of the first timer to that of the second timer is, for example, 5 : 1 or 6 : 1.

The first timer updates routing information immediately when it times out. That is, the first timer updates routing information at least once at a specified interval. On the other hand, the second timer updates routing information when it times out and if the significant-change detection flag is on at that time. This means that the interval of the second timer is the shortest interval at which routing information is updated. The significant-change detection flag is set to on only when a received PNNI routing control packet indicates that the registration of the address or the link of a terminal or the link of an ATM switch has been changed.

A system in this embodiment generates or updates routing information, not when a call request is received from a terminal, but when the first or the second timer times out. This eliminates a delay in setting up a call. When the system receives a large number of PNNI routing control packets, the system does not have to update a large volume of routing information because it updates the information at the interval of the second timer. This prevents the overall system performance from being degraded. In addition, a significant change, such as a change in terminal or ATM switch addresses or a change in link data, is reflected on routing information when the second timer times out. This allows a call from a terminal to be connected successfully.

Figure 1:
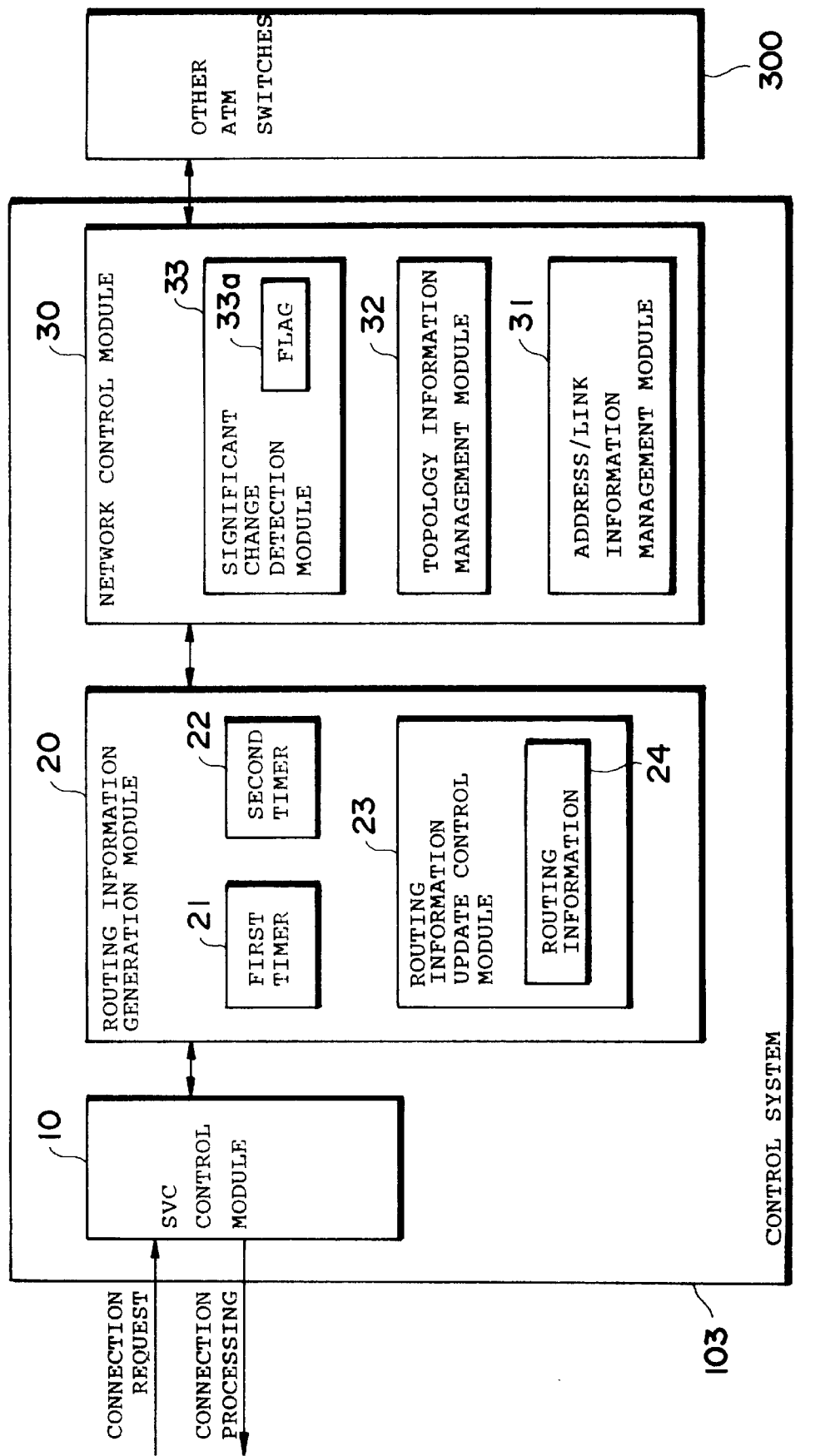
FIG. 1 is a configuration diagram showing the network control system according to the present invention.

FIG. 1 is a configuration diagram showing the major components of r the network control system according to the present invention. First, the following explains an ATM switch containing the network control system in this embodiment.

Figure 2:
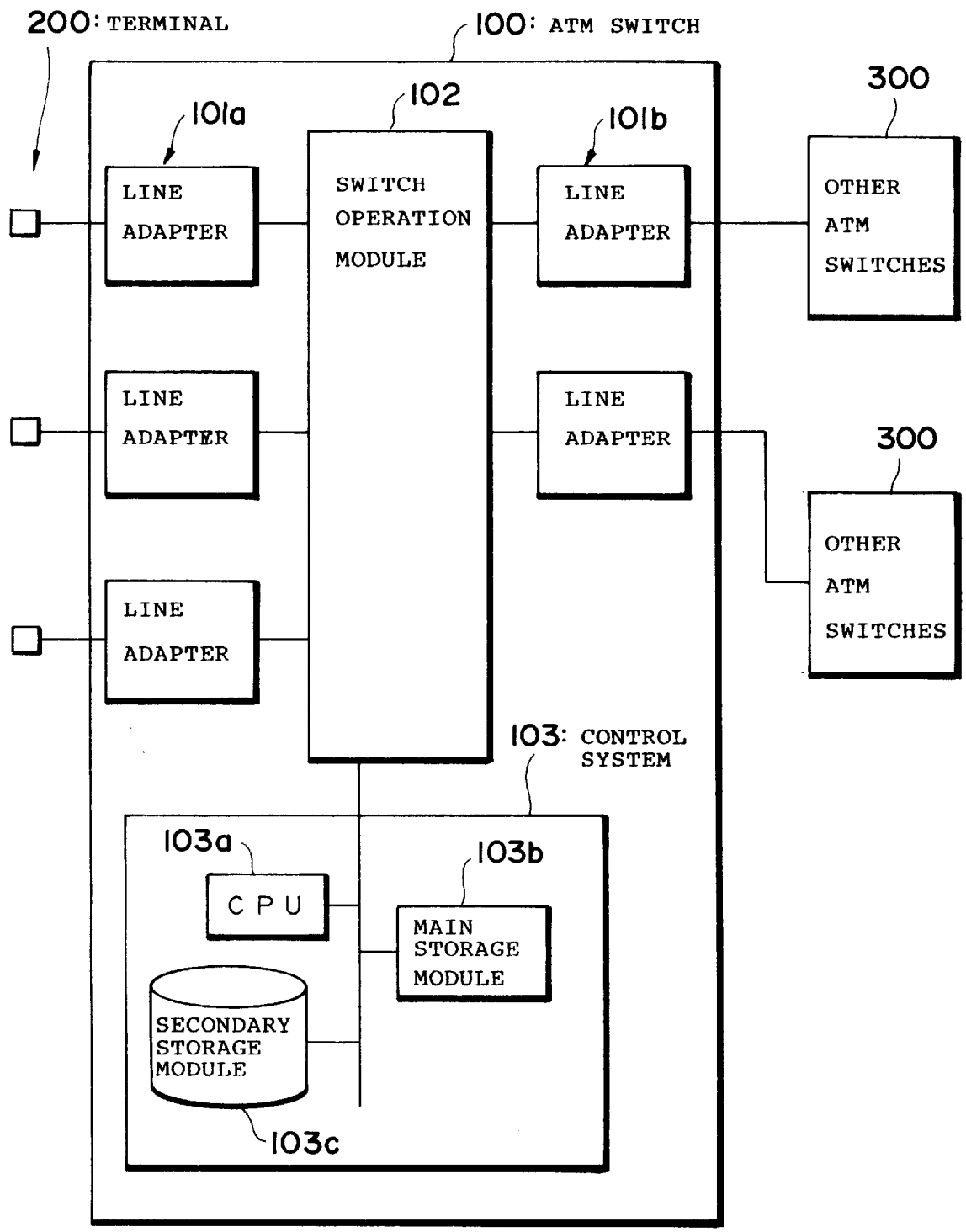
FIG. 2 is a configuration diagram of an ATM switch containing the network control system according to the present invention.

FIG. 2 is a configuration diagram of an ATM switch. In the figure, the ATM switch 100 includes the line adapter nodules 101a and 101b, switch operation module 102, and control system 103. The line adapter nodule 101a is a line adapter to which the terminal 200 is connected, while the line adapter module 101b is a line adapter to which another ATM switch 300 is connected. The switch operation module 102, the core of the ATM switch 100, exchanges cells with other ATM switches. The control system 103, composed of the CPU 103a, main storage module 103b, and secondary storage module 103c, performs various functions of the ATM switch 100 such as call connection and routing control functions.

FIG. 1 is a configuration diagram, showing the major components of this embodiment, corresponds to the control system 103 in FIG. 2. Each is a functional block including the CPU 103a, main storage module 103b, and secondary storage module 103c.

In FIG. 1, the control system 103 has the SVC control module 10, routing information generation module 20, and network control module 30. The SVC control module 10, provided for controlling SVC connection requests, processes connection requests upon receiving a call from the terminal 200 or another ATM switch 300. For example, it checks the validity of a connection request based on the routing information maintained by the routing information generation module 20.

The routing information generation module 20 generates connection route information on the terminal 200 or another ATM switch 300 based on the topology information maintained by the network control module 30, and maintains the routing information on each terminal 200 and ATM switch 300. The routing information generation module 20 has the first timer 21, second timer 22, routing information update control module 23, and routing information 24. The first timer 21 and second timer 22 each time out when a specified time elapses, with the interval of the first timer 21 greater than that of the second timer 22.

The first timer 21 updates the routing information 24 at a specified interval. This interval is the longest interval at which the routing information 24 is updated. The routing information 24 is updated at least once at this interval even when the network is in the stable state (i.e. there is no change in terminal address and switch address, and there is no change in link configuration in which the switches are connected to each other).

On the other hand, the second timer 22 updates the routing information 24 at the shortest interval. A line failure, a switch failure, or a unbalance condition (repetitive errors and error recovery processing) on the network may generate a large number of PNNI routing control packets. This in turn causes the routing information to be updated often, affecting the overall system performance. The second timer 22, the shortest-interval time timer, prevents this condition.

The routing information update control module 23 updates the routing information 24 in one of two ways. That is, when the routing information update control module 23 receives the time-out signal from the first timer 21, it updates the routing information 24 unconditionally.; on the other hand, when the routing information update control module 23 receives the time-out signal from the second timer 22, it updates the routing information 24 only if the significant flag which will be described later is on. The routing information 24, generated based on the topology information, indicates a route to each terminal 200 or ATM switch 100 or 300.

The network control module 30, composed of the address/link information management module 31, topology information management module 32, and significant change detection module 33, manages topology information, address information, and link information and detects a significant change.

The address/link information management module 31 manages the address information of the ATM switch 100 and link information denotes link configuration in which the switches are connected to each other, and the line speed and transmission delay thereon) and sends a PNNI routing control packet containing address information and link information to another ATM switch 300.

The topology information management module 32 manages topology information which is sent from another ATM switch 300 as PNNI routing control packets. Topology information is information on terminal addresses, switch addresses, line attributes, status, and so forth. Terminal addresses are those of the terminals (e.g., terminal 200 in FIG. 2) connected to an ATM switch (e.g., ATM switch 100 in FIG. 2). Switch addresses are those of the switches (e.g., ATM switch 100 or another ATM switch 300) configured in the network. Line attributes and status data denotes link configuration in which the switches are connected to each other and so forth. The line attributes and status data are stored in the address/link information management module 31 as link information.

The topology information management module 32 sends or receives PNNI routing control packets to or from another ATM switch 300 over the communication line to get topology information on each ATM switch and to keep topology information up to date. Topology information which is kept up to date in this manner keeps the ATM switch 100 informed of which ATM switches and terminals are available for use.

The significant change detection module 33 turns on the flag 33a upon detection of a pre-determined state in the network. In this embodiment, the significant change detection module 33 turns on the flag 33a (a) when the address information or link information of the ATM switch 100 is changed or (b) when a PNNI routing control packet indicating that the address information or link information of another ATM switch 300 is changed. Note that address information and link information may change according to how they are used for control.

In the above embodiment, the first timer 21 and second timer 22 are in the routing information update control module 23, and the significant change detection module 33 and other modules are in the network control module 30. It should be noted that they need not always be in the respective module. For example, the routing information update control module 23 may be in the network control module 30.

The ATM switch 100 exchanges PNNI routing control packets with other ATM switches to keep address information and link information up to date for use as topology information. And, based on this topology information, the ATM determines a route to each terminal or switch in the network and keeps this routing information as the routing information 24. When the ATM receives an SVC connection request, it references the routing information 24 to find the best route to the destination terminal or switch.

Figure 3:
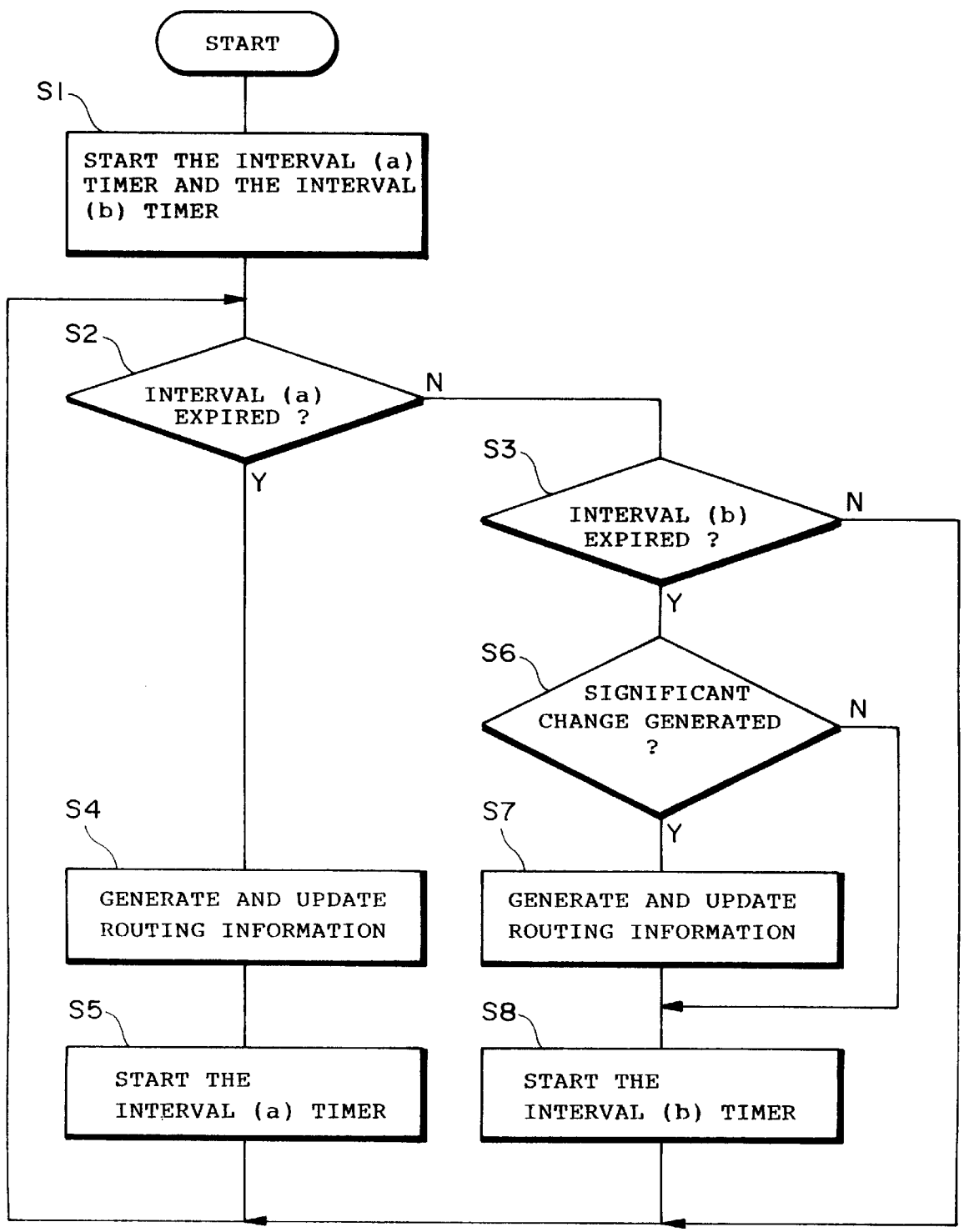
FIG. 3 is a flowchart showing how routing information is generated and updated in an embodiment of the present invention.
Figure 4:
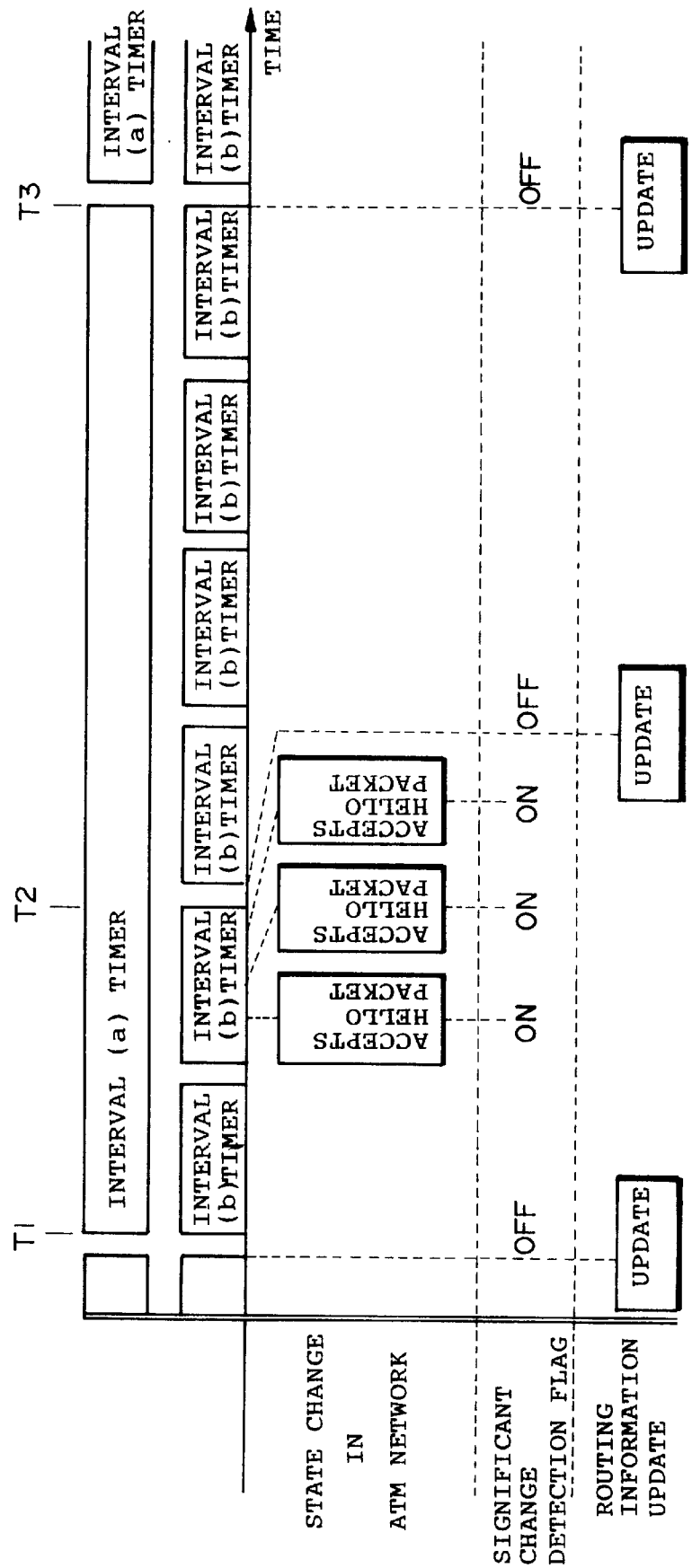
FIG. 4 is a diagram showing how routing information is generated and updated in an embodiment of the present invention.

The following explains how this embodiment generates and AmSSS[] updates routing information. FIG. 3 is a flowchart showing how routing information is generated and updated, and FIG. 4 is a diagram showing the sequence in which routing information is generated and updated.

When the ATM switch 100 becomes ready, the routing information generation module 20 starts the first timer 21 and second timer 22 (step S1). In the following discussion, the interval of the first timer 21 is (a) and the that of the second timer 22 is (b).

Before both timers time out, control loops around steps S2 and S3. When the routing information update control module 23 detects a time-out condition, it checks if the interval (a) has expired (step S2). If so, the module unconditionally generates the routing information 24 based on the existing topology information (step S4). That is, the routing information update control module 23 updates the routing information 24 based on the topology information maintained by the topology information management module 32 irrespective of whether the flag 33a in the routing information update control module 23 is on or off. This is what is done at T3 in FIG. 4. Both timers are restarted at T1 in FIG. 4. In FIG. 4, both timers are started at the same time at the point indicated by T1 and they time out at the point indicated by T3. However, it should be noted that both timers need be neither started nor timed out at the same time. After the routing information 24 is updated, the timer with the interval of (a) is started (step S5) and then control is returned to step S2.

On the other hand, if it is found in step S2 that the interval that has expired is not (a), control goes to step S3. After checking in step S3 that the interval (b) has expired, control goes to step S6 where the routing information update control module 23 checks if the flag 33a in the significant change detection module 33 is on. If it is on, the routing information update control module 23 generates the routing information 24 from the topology information, maintained by the topology information management module 32, in order to update the routing information 24 (step S7). This processing corresponds to T2 in FIG. 4.

Then, the timer with the interval of (b) is restarted (step S8) and control is returned to step S2. If it is found that the flag 33a is off in step S6, control goes to step S8 because the routing information 24 need not be updated. The timer with the interval of (b) is restarted and control is returned to step S2.

As described above, this embodiment updates routing information not when a call request is received from a terminal but when the time-out signal is generated by the first timer or second timer. This enables a connection to be established without delay when an SVC connection request is received.

The routing information update control module checks if the significant change detection flag is on whenever the second timer times out. If the flag is on, the module generates and updates routing information. This prevents routing information from being updated at an interval shorter than that of the second timer even when a condition occurs under which routing information is updated repeatedly due to a repetition of error generation and recovery, thus minimizing the overall system performance. If regarding the link information to denote the significant information as information to denote link configuration in which the switches are connected to each other, the routing information is updated only when the time of the second timer expires and also such a link configuration changes. Accordingly, the stable network requires no further update of the routing information. On the other hand, when a significant change is detected, the routing information update control module updates routing information at the interval of the second timer, allowing an SVC connection request to be satisfied.

What is claimed is:

1. A network control system comprising:

a significant change detection module setting a significant change detection flag to on upon detecting a pre-determined condition on a network;

a first timer generating a time-out signal at a specific interval;

a second timer generating a time-out signal at an interval shorter than that of the first timer; and a routing information update control module having routing information for use in routing a request over the network, unconditionally updating corresponding routing information upon receiving the time-out signal from the first timer, and updating the routing information upon receiving the time-out signal from the second timer only if the significant change detection flag is on.

2. A network control system which controls switched virtual connection on a network, containing a plurality of interconnected switches each having an asynchronous transfer mode interface, by referencing routing information generated by exchanging PNNI routing control packets, the network control system comprising:

a significant change detection module setting a significant change detection flag to on upon detecting a pre-determined condition on the network;

a first timer generating a time-out signal at a specific interval;

a second timer generating a time-out signal at an interval shorter than that of the first timer; and a routing information update control module having the routing information, unconditionally updating corresponding routing information upon receiving the time-out signal from the first timer, and updating the routing information upon receiving the time-out signal from the second timer only if the significant change detection flag is on.

3. A network control system as set forth in claim 2, wherein the pre-determined condition occurs when the address of a switch changes.

4. A network control system as set forth in claim 2, wherein the pre-determined condition occurs when the address of a terminal connected to a switch changes.

5. A network control system as set forth in claim 2, wherein the pre-determined condition occurs when a link connecting a switch to another switch changes.

* * * * *